United States Patent
Liao et al.

(10) Patent No.: US 7,301,589 B2
(45) Date of Patent: Nov. 27, 2007

(54) MOLD FRAME FOR LIQUID CRYSTAL DISPLAY MODULE

(75) Inventors: Kuo-Dong Liao, Taichung Hsien (TW); Yao-Tung Wang, Taoyuan (TW); Ho-Ming Su, Pa Te (TW)

(73) Assignee: Chunghwa Picture Tubes Ltd., Taipei (TW)

( * ) Notice: Subject to any disclaimer, the term of this patent is extended or adjusted under 35 U.S.C. 154(b) by 50 days.

(21) Appl. No.: 10/914,233

(22) Filed: Aug. 10, 2004

(65) Prior Publication Data

US 2006/0033858 A1    Feb. 16, 2006

(51) Int. Cl.
*G02F 1/1333* (2006.01)

(52) U.S. Cl. .......................................... 349/58

(58) Field of Classification Search ................... 349/58
See application file for complete search history.

(56) References Cited

U.S. PATENT DOCUMENTS

| | | | |
|---|---|---|---|
| 6,593,979 B1 * | 7/2003 | Ha et al. | 349/58 |
| 6,885,419 B2 * | 4/2005 | Ogawa | 349/58 |
| 6,919,937 B2 * | 7/2005 | Kim et al. | 349/58 |
| 6,950,154 B2 * | 9/2005 | Lee | 349/58 |
| 2003/0058380 A1 * | 3/2003 | Kim et al. | 349/58 |
| 2003/0122995 A1 * | 7/2003 | Park et al. | 349/58 |
| 2003/0234895 A1 * | 12/2003 | Sugawara et al. | 349/58 |
| 2004/0041961 A1 * | 3/2004 | Lee | 349/58 |
| 2005/0179832 A1 * | 8/2005 | Kim et al. | 349/58 |
| 2005/0259191 A1 * | 11/2005 | Park et al. | 349/58 |

* cited by examiner

*Primary Examiner*—James A. Dudek

(57) ABSTRACT

A mold frame liquid crystal display module is disclosed. Supporting stands of the mold frame for supporting a LCD (liquid crystal display) panel, which are separated from each other by a spacer, can reduce the influence resulting from local deformation by releasing torque generated by turning screws in, and solve the ill phenomena of oppressive light leakage and ripple due to interference generated by the mold frame and the LCD panel in the conventional backlight module.

20 Claims, 5 Drawing Sheets

MOLD FRAME FOR LIQUID CRYSTAL DISPLAY MODULE

FIELD OF THE INVENTION

The present invention relates to a mold frame for liquid crystal display module, and more particularly, to a mold frame capable of releasing a torque generated by turning screws in.

BACKGROUND OF THE INVENTION

An liquid crystal display (LCD) panel of an LCD is not a self-luminescent display element and thus requires a light source provided by a backlight module. In other words, the backlight module provides the brightness, uniformity of brightness and the visual angle (the aligning angle of light emission) required for displaying pictures. With regard to mechanical properties, the backlight module must be thin, lightweight and tolerant to shock. The properties of the backlight module directly influence the quality of the LCD, and thus, the backlight module becomes a very important component of the LCD screen.

Typically, the assembling process of the LCM (LCD module) entails assembling an LCD panel, a driver IC (integrated circuit), a backlight module and other components, fixing the sides of the LCM, comprising a metal frame, the LCD panel and the mold frame, by screws to enhance the whole structural strength. After examining the LCM for quality assurance, the manufacturing process of the LCM is finished.

Reference is made to FIG. 1, which illustrates a three-dimensional schematic diagram of an LCM in the prior art. The LCM 100 in the prior art comprises a metal frame 113 and an LCD panel 119, wherein a mold frame (not shown) is disposed in the metal frame 113, and the LCD panel 119 is disposed on the mold frame. A fixing rack 115, which is installed on a side of the metal frame 113, can be used to fix the LCM 100 onto other structures. In order to enhance structural strength, screws 111, such as self-tapping screws, are used to fasten the fixing rack 115, the metal frame 113, the mold frame and the LCD panel 119 together.

Reference is made to FIG. 2, which illustrates a three-dimensional schematic diagram of a side of the prior art LCM in the region 110 of FIG. 1. A self-tapping screw 111 is used to fasten the fixing rack 115, the metal frame 113, the mold frame (not shown) and the LCD panel 119 together via a hole 116 of the fixing rack 115 and a hole 118 of the metal frame 113 in the side of the LCM.

Reference is now made to FIG. 3, which illustrates a three-dimensional schematic diagram of another side of the prior art LCM in the region 130 of FIG. 1. A self-tapping screw 111 is used to fasten the metal frame 113, the mold frame (not shown) and the LCD panel 119 together via a hole 118 of the metal frame 113 in another side of the LCM.

For further discussion, reference is made to FIG. 4, which illustrates a three-dimensional cutaway diagram showing the mold frame and the metal frame of the prior art. The mold frame 117, which is formed from plastic with a mold, comprises a base 151, a sidewall 153 disposed on and surrounding the edge of the base 151 to define a space 155, and a supporting stand 157 disposed on the base 151 along an inner side of the sidewall 153 and disposed in the space 155, wherein the supporting stand 157 is used to support the LCD panel 119.

More specifically, the mold frame 117 can be disposed in a space 167 defined by the metal frame 113, wherein the metal frame 113 comprises a bottom plate 161, a sidewall 163 disposed on and surrounding the edge of the bottom plate 161 and an upper frame 165 disposed on the sidewall 163, wherein the bottom plate 161, the sidewall 163 and the upper frame 165 define a space 167. When the mold frame 117 is disposed in the space 167 of the metal frame 113, the sidewall 163 of the metal frame 113, the sidewall 153 of the mold frame 117 and the supporting stand 157 are fastened securely together by the screw 111.

Reference is made to FIGS. 5(a) and 5(b), which illustrate cross-sectional diagrams of the prior art LCM along the line A-A'. Reference is made to FIG. 5(a), which shows that the self-tapping screw may generate a transient torque 121 when the screw is used to securely fasten the metal frame 113 and the mold frame 117 together. In FIG. 5(b), the metal frame 113 is more rigid, so the torque doesn't influence it. However, the mold frame 117 is less rigid and constrained in the horizontal direction due to the metal frame 113, so the torque 121 of FIG. 5(a) causes the mold frame 117 to generate a local deformation along the vertical direction, as shown in the region 125. The deformation of the mold frame 117 in the region 125 may result in interference on the LCD panel 119. Therefore, when a user presses a corner of the LCM 100 and wiggles it, ill phenomena such as oppressive light leakage and ripple may appear on the LCD panel 119.

The local deformation in the mold frame during the assembling process of the LCM has mainly been addressed by two methods. One method entails either applying a flexible material to the components in the LCM in order to decrease the torque or strengthening the molded frame by making it more rigid. The other method involves releasing the torque of the screw or loosening the screw by about a quarter turn during the stage of examining the LCM, after which time it is re-tightened. However, releasing the torque of the screw may disengage the screw completely from the mold frame. Furthermore, loosening and re-tightening the screw may wear down the threads of the screw fastening into the mold frame, causing some doubts about the structural integrity of the LCM and hence increasing the load of LCM inspectors.

Accordingly, it is indeed necessary to provide a molded frame for LCM, so as to improve the ill phenomena of severe light leakage and ripple apparent on the LCD panel due to the local deformation of the molded frame resulting from the torque generated by turning screws in.

SUMMARY OF THE INVENTION

It is an aspect of the present invention to provide a mold frame for liquid crystal display module comprising supporting stands, which are separated from each other by spacers and can reduce the influence resulting from local deformation by releasing the torque generated by turning screws in and thereby can avoid the ill phenomena of severe light leakage and ripple due to interference as generated by the mold frame and the LCD panel in the conventional backlight module.

According to the aforementioned aspect of the present invention, there is provided a mold frame for liquid crystal display module comprising a base, a sidewall disposed on the base and surrounding an edge thereof to define a space, and a plurality of supporting stands disposed on the base and located in the space along an inner side of the sidewall, wherein the supporting stands are separated from each other by spacers.

In a preferred embodiment of the present invention, the aforementioned mold frame is formed from plastic with a mold.

In a preferred embodiment of the present invention, a profile of the aforementioned spacer in cross-sectional view may be a triangle, a rectangle, a trapezoid, a polygon or a curve.

The mold frame has supporting stands separated from each other by spacers, which are able to release the torque generated by turning screws in and reduce the influence resulting from the local deformation of the mold frame. As a result, the ill phenomena of oppressive light leakage and ripple due to interference generated by the mold frame and the LCD panel in the conventional backlight module are solved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention discloses a mold frame for liquid crystal display module. The mold frame has supporting stands separated from each other by a spacer, for releasing the torque generated by turning screws in and for reducing the influence resulting from the local deformation of the mold frame, so as to solve the ill phenomena of oppressive light leakage and ripple due to interference generated by the mold frame and the LCD panel as in the conventional backlight module. In order to describe the mold frame for the liquid crystal display module of the present invention more explicitly and completely, the following description is stated with reference to FIGS. 6 to 8(e).

Figure 1:
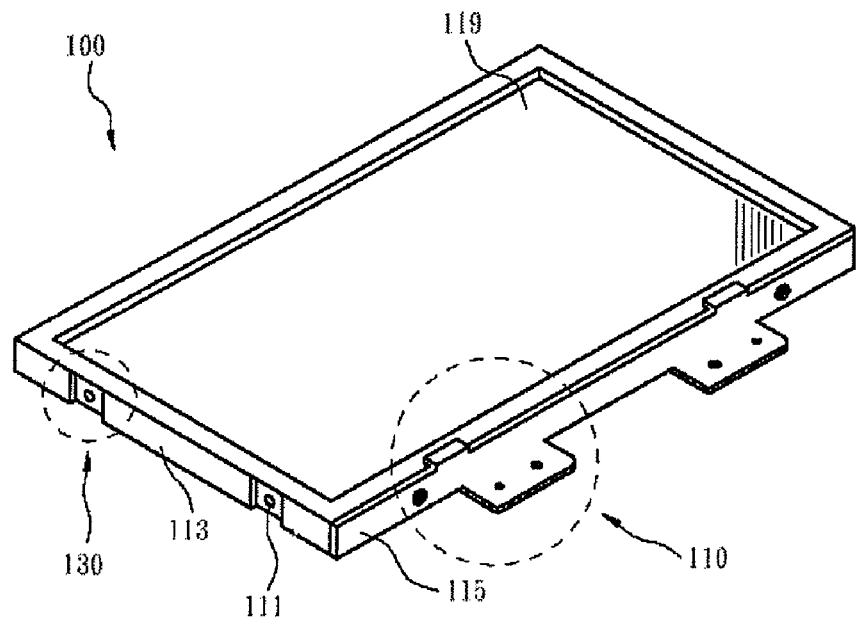
FIG. 1 illustrates a three-dimensional schematic diagram showing the LCM in the prior art.
Figure 2:
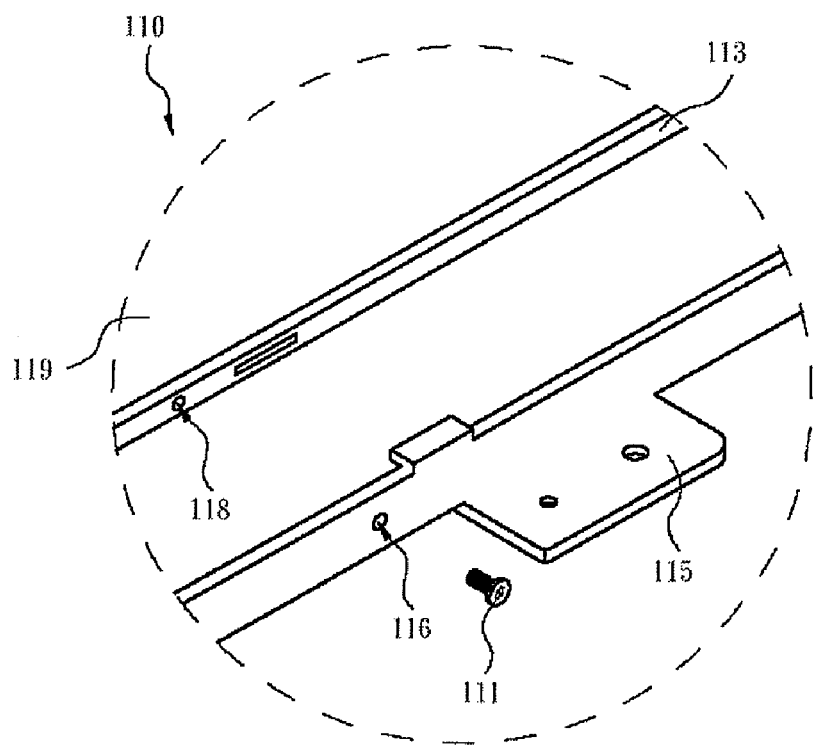
FIG. 2 illustrates a three-dimensional schematic diagram showing a side of the LCM in the prior art according to the region 110 of FIG. 1.
Figure 3:
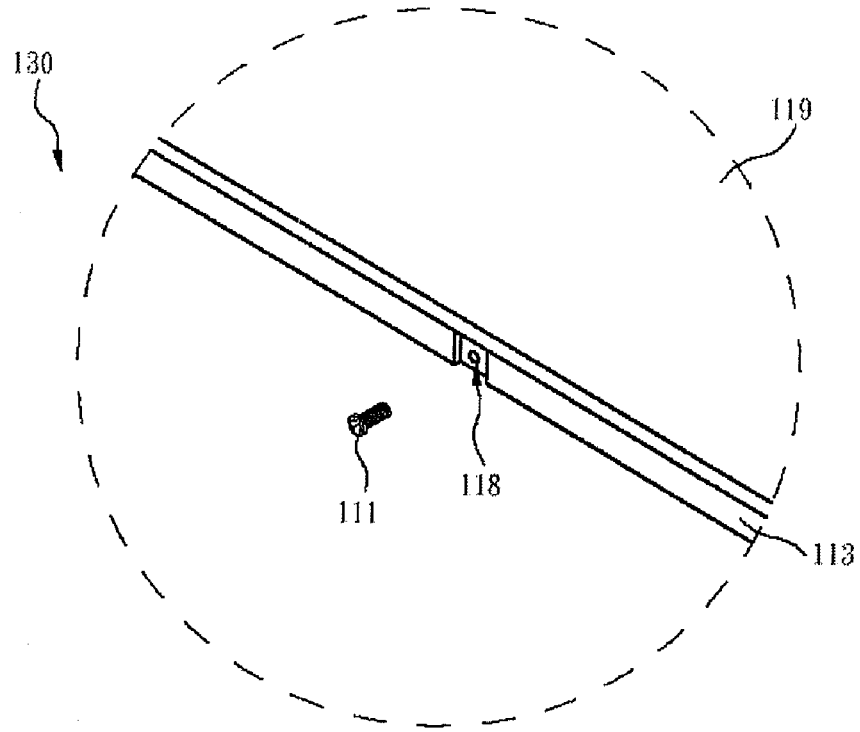
FIG. 3 illustrates a three-dimensional schematic diagram showing another side of the LCM in the prior art according to the region 130 of FIG. 1.
Figure 4:
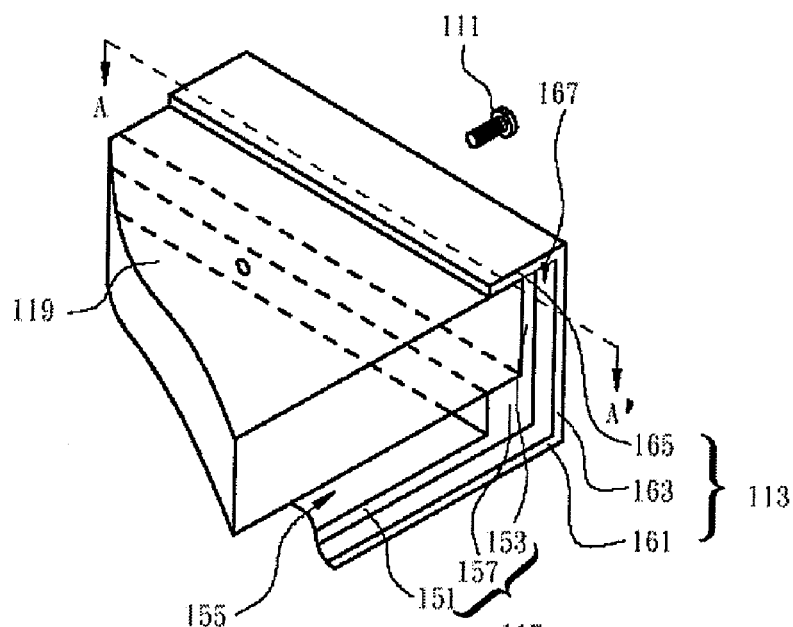
FIG. 4 illustrates a three-dimensional schematic diagram showing the mold frame and the metal frame in the prior art.
Figure 5A:
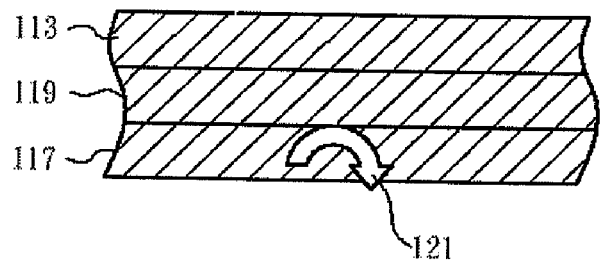
FIGS. 5(a) and 5(b) illustrate cross-sectional diagrams showing the LCM in the prior art along the line A-A'.
Figure 5B:
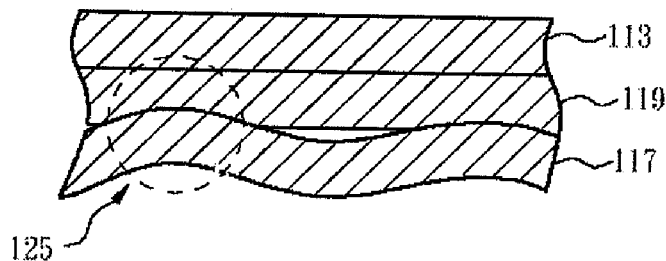
Figure 6:
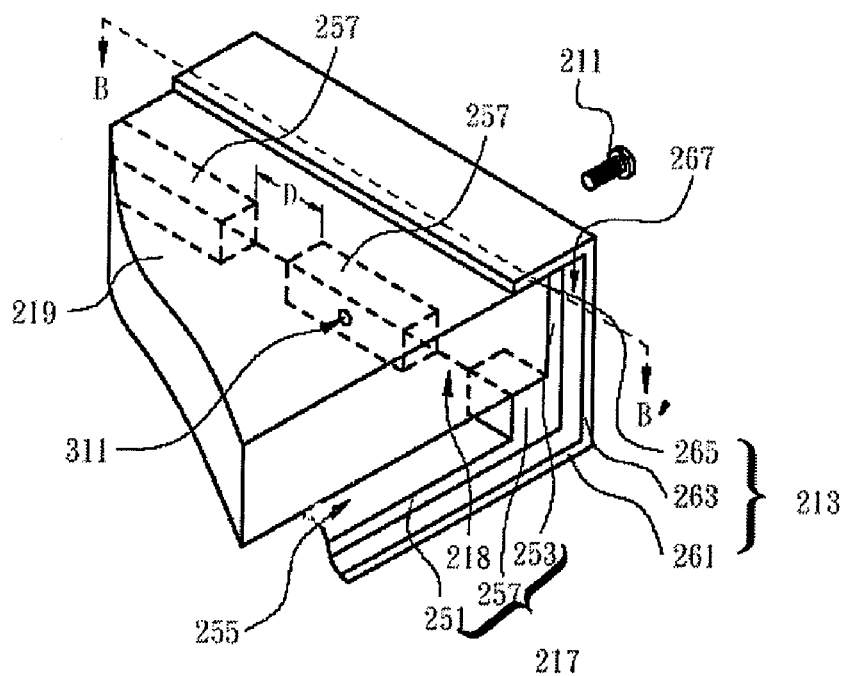
FIG. 6 illustrates a three-dimensional schematic diagram showing the mold frame and the metal frame in accordance with a preferred embodiment of the present invention.

Reference is made to FIG. 6, which illustrates a three-dimensional schematic diagram showing the mold frame and the metal frame in accordance with a preferred embodiment of the present invention.

The mold frame 217, which is formed from plastic with a mold, comprises a base 251, a sidewall 253 disposed on the base 251 and surrounding an edge thereof to define a space 255, and a plurality of supporting stands 257, which are used to support the LCD panel 219 that is disposed on the base 251 and located in the space 255 along an inner side of the sidewall 253, wherein every two supporting stands 257 are spaced from each other by a length D of a spacer 218, and the length D may be from 10 mm to 20 mm but not limited herein. Nevertheless, the sizes and the profiles of the aforementioned supporting stands 257 and the spacer 218 depend on the actual requirement but are not limited herein. A backlight source may be typically disposed on the base 251. A person skilled in the art can understand the types and configurations of the backlight source in details, and thus the details of the backlight source are not recited herein.

More specifically, the mold frame 217 can be disposed in the space 267 defined by the metal frame 213, wherein the metal frame 213 comprises a bottom plate 261, a sidewall 263 disposed on the bottom plate 261 and surrounding an edge thereof, and an upper frame 265 disposed on the sidewall 263. The bottom plate 261, the sidewall 263, and the upper frame 265 define a space 267. When the mold frame 217 is disposed in the space 267 of the metal frame 213, the sidewall 263 of the metal frame 213, the sidewall 253 of the mold frame 217, and the supporting stands 257 can be fastened securely by a screw 211, wherein at least one of the supporting stands 257 respectively has a fastening hole 311 substantially vertical to the sidewall 253 and the sidewall 263, and the screw is inserted into the fastening hole 311.

Figure 7A:
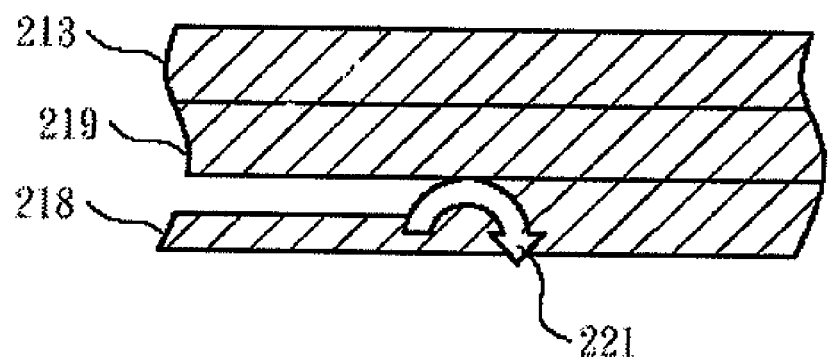
FIGS. 7(a) and 7(b) illustrate cross-sectional diagrams showing the LCM along the line B-B' in accordance with a preferred embodiment of the present invention.
Figure 7B:
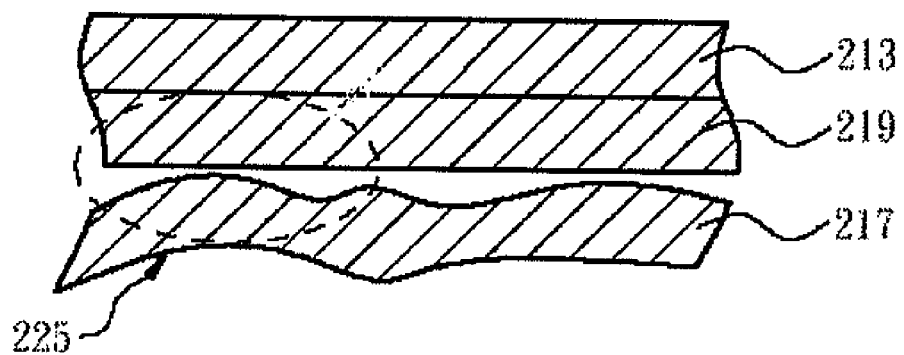

Reference is made to FIGS. 7(a) to 7(b), which illustrate cross-sectional diagrams showing the LCM along the line B-B' in accordance with a preferred embodiment of the present invention. Reference is made to FIG. 7(a), which shows that the screw may generate a transient torque 221 when the self-tapping screw is used to fasten the metal frame 213 and the mold frame 217 securely. Next, reference is made to FIG. 7(b). The mold frame 217 generates a local deformation resulting from the torque 221, as shown in the region 225. However, the supporting stands (not shown) are separated from each other by the spacers 218, even when the mold frame 217 generates the local deformation along the vertical direction, the spacers 218 can release the torque. The supporting stands do not compress the LCD panel 219 to result in interference, and an ill phenomenon such as ripple can be avoided on the LCD panel 219.

Figures 8A, 8B:
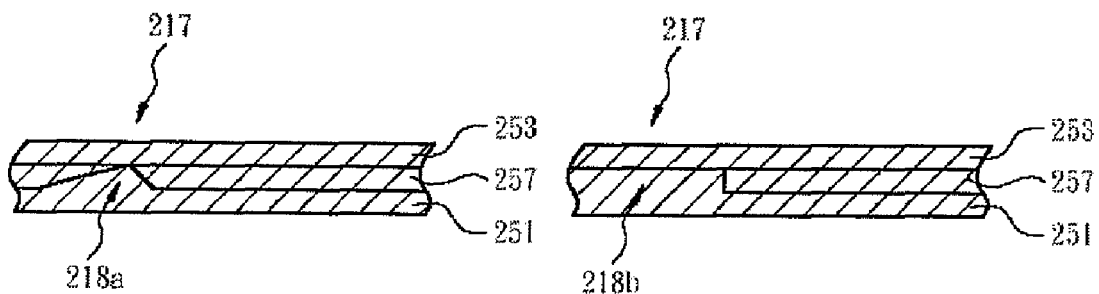
FIGS. 8(a) to 8(e) illustrate profiles of the mold frame in a cross-sectional view according to another preferred embodiment of the present invention.
Figures 8C, 8D:
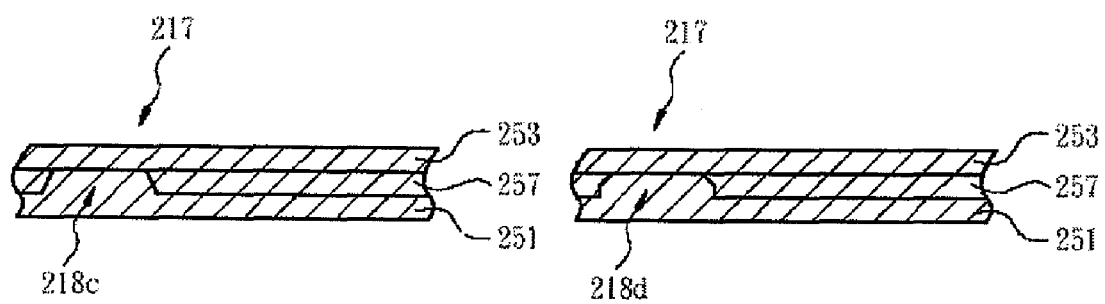
Figure 8E:
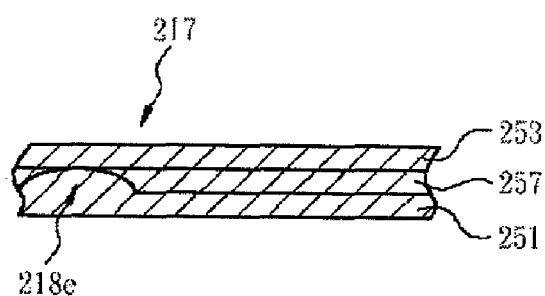

It is worthy to mention that other sizes or profiles of the spacers of the mold frame within the spirit and scope of the present invention can be understood by a person skilled in the art. For example, reference is made to FIGS. 8(a) to 8(e), which illustrate profiles of the mold frame 217 in a cross-sectional view according to another preferred embodiment of the present invention. The profiles of the spacers between the supporting stands 257 of the mold frame 217 in the top view may be a triangular spacer 218a as shown in FIG. 8(a), a rectangular spacer 218b as shown in FIG. 8(b), a trapeziform spacer 218c as shown in FIG. 8(c), a polygonal spacer 218d as shown in FIG. 8(d), a curved spacer 218e as shown in FIG. 8(e) or the like. These above spacers may completely separate the supporting stands. Alternatively, the spacers may be recesses for partially separating the supporting stands. The recesses extend from a top of the supporting stands to a bottom thereof and expose a portion of the base. In other words, a portion of the supporting stand is connected with the sidewall of the mold frame at the recess. The profiles of the recesses between the supporting stands of the mold frame in the upper view may be triangular, rectangular, trapeziform, polygonal, curved or the like. Therefore, a single supporting stand with the above recesses can also have the function for releasing the torque generated by turning screws in. In brief, the spacers between the supporting stands or the recesses within thereof are employed to prevent interference with the LCD panel, so the profiles and the sizes of the spacers between the supporting stands or the same ones of the recesses within thereof are dependent on the actual requirement but are not limited herein.

Therefore, according to the aforementioned preferred embodiments, one advantage of the mold frame for liquid crystal display module of the present invention is that supporting stands for supporting the LCD panel, which are separated from each other by the spacer, can reduce the influence resulting from the local deformation of the mold frame by releasing torque generated by turning screws in, solving ill phenomena of oppressive light leakage and ripple due to interference generated by the molded frame and the LCD panel in the conventional backlight module.

As is understood by a person skilled in the art, the foregoing preferred embodiments of the present invention are illustrated of the present invention rather than limiting of the present invention. It is intended that various modifications and similar arrangements be included within the spirit and scope of the appended claims, the scope of which should be accorded the broadest interpretation so as to encompass all such modifications and similar structure.

What is claimed is:

1. A mold frame of backlight module, comprising:
   a base;
   a sidewall expanded the base and surrounding an edge thereof; and
   a plurality of supporting stands disposed on the base and located in an inner side of the sidewall, wherein every two supporting stands have a spacer from each other, and the supporting stands have at least one fastening hole, and the fastening hole is substantially vertical to and penetrates through the sidewall.

2. The mold frame of backlight module according to claim 1, wherein the mold frame is formed from plastic with a mold.

3. The mold frame of backlight module according to claim 1, wherein a profile of the spacer is selected from the group consisting of a triangle, a rectangle, a trapezoid and a curve.

4. A liquid crystal display module, comprising:
   a backlight module comprising:
      a mold frame, comprising:
         a base;
         a sidewall expanded by the base and surrounding an edge thereof;
      a backlight source disposed on the base; and
      a plurality of supporting stands disposed on the base and located in an inner side of the sidewall, wherein every two supporting stands have a spacer from each other, wherein at least one of the supporting stands has at least one fastening hole, and the fastening hole is substantially vertical to and penetrates through the sidewall; and
   an LCD panel fixed on the supporting stands.

5. The liquid crystal display module according to claim 4, wherein the mold frame is formed from plastic with a mold.

6. The liquid crystal display module according to claim 4, wherein a profile of the spacer is selected from the group consisting of a triangle, a rectangle, a trapezoid and a curve.

7. The liquid crystal display module according to claim 4, further comprising a metal frame, wherein the metal frame comprises:
   a bottom plate; and
   an other sidewall disposed on the bottom plate and surrounding an edge thereof to define an space to receive the mold frame therein, wherein the fastening hole is substantially vertical to and penetrates through the other sidewall.

8. A liquid crystal display (LCD) module, comprising:
   a metal frame, comprising:
      a bottom plate;
      a first sidewall expanded by the bottom plate and surrounding an edge thereof; and
      an upper frame disposed on the first sidewall, and the bottom plate, the first sidewall, and the upper frame define a space;
   a backlight module disposed in the space, comprising:
      a mold frame, comprising:
         a base;
         a second sidewall expanded by the base and surrounding an edge thereof; and
         a plurality of supporting stands disposed on the base and located in an inner side of the second sidewall, wherein every two supporting stands have a spacer from each other, and the supporting stands have at least one fastening hole, and the fastening hole is substantially vertical to and penetrates through the second sidewall and the first sidewall; and
      a backlight source disposed on the base; and
   an LCD panel fixed on the supporting stands.

9. The liquid crystal display module according to claim 8, wherein the mold frame is formed from plastic with a mold.

10. The liquid crystal display module according to claim 8, wherein the first sidewall, the second sidewall, and the supporting stands are fastened securely by at least one screw via the fastening hole.

11. The liquid crystal display module according to claim 8, wherein a profile of the spacer is selected from the group consisting of a triangle, a rectangle, a trapezoid and a curve.

12. A liquid crystal display (LCD) module, comprising:
   a backlight module, comprising:
      a mold frame, comprising:
         a base;
         a sidewall expanded by the base and surrounding an edge thereof; and
         a plurality of supporting stands disposed on the base and located in an inner side of the sidewall, wherein every two supporting stands are spaced from each other by a length of a recess extending from a top of the supporting stands to a bottom thereof and exposing a portion of the base, and the supporting stands have at least one fastening hole, and the fastening hole is substantially vertical to and penetrates through the sidewall; and
      a backlight source disposed on the base; and
   an LCD panel fixed on the supporting stands.

13. The liquid crystal display module according to claim 12, wherein the mold frame is formed from plastic with a mold.

14. The liquid crystal display module according to claim 12, wherein a profile of the recess is selected from the group consisting of a triangle, a rectangle, a trapezoid, and a curve.

15. The liquid crystal display module according to claim 12, further comprising a metal frame, wherein the metal frame comprises:
   a bottom plate; and
   an other sidewall disposed on the bottom plate and surrounding an edge thereof to define an other space to receive the mold frame therein, wherein the fastening hole is substantially vertical to and penetrates through the other sidewall.

16. The liquid crystal display module according to claim 15, wherein the sidewall, the other sidewall, and the supporting stands are fastened securely by at least one screw via the fastening hole.

17. The mold frame of backlight module according to claim 1, wherein a profile of the spacer is selected from the group consisting of a triangle, a trapezoid and a curve.

18. The liquid crystal display module according to claim 4, wherein a profile of the spacer is selected from the group consisting of a triangle, a trapezoid and a curve.

19. The liquid crystal display module according to claim 8, wherein a profile of the spacer is selected from the group consisting of a triangle, a trapezoid and a curve.

20. The mold frame of backlight module according to claim 1, wherein the sidewall, and the supporting stands are fastened securely by at least one screw via the fastening hole.

* * * * *